US012076902B2

(12) United States Patent
Lee

(10) Patent No.: US 12,076,902 B2
(45) Date of Patent: Sep. 3, 2024

(54) ULTRA-HIGH-MOLECULAR-WEIGHT FIBER MANUFACTURING METHOD AND SYSTEM

(71) Applicant: QUANN CHENG INTERNATIONAL CO., LTD., Pingtung (TW)

(72) Inventor: Hsing-Hsun Lee, Kaohsiung (TW)

(73) Assignee: QUANN CHENG INTERNATIONAL CO., LTD., Pingtung County (TW)

( * ) Notice: Subject to any disclaimer, the term of this patent is extended or adjusted under 35 U.S.C. 154(b) by 473 days.

(21) Appl. No.: 17/527,176

(22) Filed: Nov. 16, 2021

(65) Prior Publication Data

US 2023/0109815 A1 Apr. 13, 2023

(30) Foreign Application Priority Data

Oct. 8, 2021 (TW) .................................. 110137571

(51) Int. Cl.
| | | |
|---|---|---|
| B29C 48/05 | (2019.01) | |
| B29C 48/00 | (2019.01) | |
| B29C 48/28 | (2019.01) | |
| B29C 48/92 | (2019.01) | |
| D01D 5/088 | (2006.01) | |
| D01D 11/00 | (2006.01) | |

(52) U.S. Cl.
CPC .......... *B29C 48/05* (2019.02); *B29C 48/0018* (2019.02); *B29C 48/28* (2019.02); *B29C 48/92* (2019.02); *D01D 5/088* (2013.01); *D01D 11/00* (2013.01)

(58) Field of Classification Search
CPC ........ D01D 5/088; D01D 11/00; D01D 5/084; B29C 48/28; B29C 48/0018; B29C 48/92; B29C 48/05
See application file for complete search history.

(56) References Cited

U.S. PATENT DOCUMENTS

| | | | |
|---|---|---|---|
| 11,432,611 B2 * | 9/2022 | Kim | .......................... D01F 6/46 |
| 2006/0135699 A1 * | 6/2006 | Li | ......................... C08L 23/142 |
| | | | 525/240 |

\* cited by examiner

*Primary Examiner* — Emmanuel S Luk
(74) *Attorney, Agent, or Firm* — Leong C. Lei

(57) ABSTRACT

An ultra-high-molecular-weight fiber manufacturing method is provided. The method includes: removing moisture in a mixed liquid to form a to-be-processed raw material, and supplying the to-be-processed raw material to a spinning device, where the spinning device heats the to-be-processed raw material in different stages, to make the to-be-processed raw material form a semi-molten state and be extruded toward a discharge outlet, to spin at least one fibril; cooling the at least one fibril, to form a first wire; if hardness of the first wire is not in a hardness range, selecting at least two discontinuous heating zones located in the spinning device to perform temperature adjustment; stretching, heating, and re-stretching the first wire, to form a second wire; winding the second wire around a drum; and stretching, drying, and re-stretching the second wire, to form a final wire product.

10 Claims, 2 Drawing Sheets

ULTRA-HIGH-MOLECULAR-WEIGHT FIBER MANUFACTURING METHOD AND SYSTEM

BACKGROUND

Cross-Reference to Related Application

This application claims the benefit of Taiwan Patent Application No. 110137571, filed on 8 Oct. 2021, which is hereby incorporated by reference for all purposes as if fully set forth herein.

Technical Field

The present invention mainly relates to a fiber manufacturing method and system, and particularly relates to an ultra-high-molecular-weight fiber manufacturing method and system capable of adjusting temperatures of a plurality of heating zones of a spinning device in stages.

Related Art

In a conventional fiber manufacturing method, a masterbatch used for manufacturing a fiber product is passed through a plurality of heating zones of a spinning device in order. The plurality of heating zones is controlled to heat the masterbatch continuously and uniformly in a same temperature range, to make the masterbatch directly form a molten state, to form a to-be-processed raw material. Then, the spinning device extrudes the to-be-processed raw material, to make the to-be-processed raw material flow into a spinning box and make a spinneret of the spinning box spin at least one fibril. Furthermore, stretching, cooling and shaping, yarn receiving, and other steps and procedures are performed on the at least one fibril, to finish manufacturing of the fiber product.

In the foregoing conventional fiber manufacturing method, the masterbatch is in the molten state (that is, a liquid state). Therefore, when extruding the to-be-processed raw material generated by the masterbatch, the spinning device can hardly further compress the volume of the to-be-processed raw material, to improve the density of the fiber product. Consequently, the tensile strength of the fiber product cannot be further improved. In addition, the plurality of heating zones of the spinning device all heats the masterbatch uniformly at the same temperature range. Therefore, when the hardness of the at least one fibril does not meet a requirement for the fiber product, the conventional fiber manufacturing method cannot adjust heating temperatures of the plurality of heating zones in stages in real time. As a result, a front section of the manufactured fiber product is a substandard waste product and needs to be scrapped or abandoned, causing a problem of production cost loss.

In view of this, it is necessary to provide an ultra-high-molecular-weight fiber manufacturing method and system, to resolve the foregoing problem.

SUMMARY

An objective of the present invention is to provide an ultra-high-molecular-weight fiber manufacturing method. The method can adjust temperatures of a plurality of heating zones of a spinning device in stages.

Another objective of the present invention is to provide an ultra-high-molecular-weight fiber manufacturing system. The system can adjust the temperatures of the plurality of heating zones in stages.

To achieve the foregoing objectives, the present invention provides an ultra-high-molecular-weight fiber manufacturing method, comprising: mixing a fiber slurry with a plurality of colloidal particles, to form a mixed liquid, putting the mixed liquid into a hopper, and performing hot air drying on the mixed liquid using a first drying device to remove moisture, to form a to-be-processed raw material, where a baking temperature of the first drying device is in a range of 100° C. to 150° C.; supplying the to-be-processed raw material to a spinning device, where the spinning device has at least four heating zones, the at least four heating zones respectively heat the to-be-processed raw material in different stages, to make the to-be-processed raw material form a semi-molten state, and the spinning device extrudes the to-be-processed raw material toward a discharge outlet, to make the to-be-processed raw material flow into a spinning box and make a spinneret of the spinning box spin at least one fibril; cooling the at least one fibril using a cooling liquid, to shape a surface of the at least one fibril, to form a first wire; analyzing hardness of the first wire using a hardness analyzing device, where if the hardness of the first wire is not in a hardness range, at least two discontinuous heating zones are selected from the at least four heating zones using a micro-controller to perform temperature adjustment; passing the first wire through a first stretching device, to make a plurality of rollers of the first stretching device stretch the first wire, heating a stretched first wire using a heating device, to soften the first wire, passing a softened first wire through a second stretching device, and performing stretching again, to form a second wire; winding the second wire around a drum; and passing the second wire wound around the drum through a third stretching device, to make a plurality of rollers of the third stretching device stretch the second wire, drying a stretched second wire using a second drying device, to reduce humidity of the second wire, passing a dried second wire through a fourth stretching device, and performing stretching again, to form a final wire product.

The present invention provides an ultra-high-molecular-weight fiber manufacturing system, comprising: a first drying device, configured to dry a mixed liquid located in a hopper, to remove moisture in the mixed liquid and form a to-be-processed raw material; a spinning device, having a feed inlet, at least four heating zones, and a discharge outlet, where the feed inlet is in communication with the hopper, for the to-be-processed raw material to flow to the at least four heating zones, the at least four heating zones are continuously arranged between the feed inlet and the discharge outlet and respectively heat the to-be-processed raw material in different stages, to make the to-be-processed raw material form a semi-molten state, a weight sensor is arranged in each of the heating zones, the weight sensor is configured to measure a melt index (MI) of the to-be-processed raw material in the corresponding heating zone, to obtain a melt value, the spinning device spins a fibril formed by the to-be-processed raw material, and a first wire is formed after the fibril is cooled using a cooling liquid; a hardness analyzing device, configured to analyze hardness of the first wire, to obtain fiber hardness, where a second wire is formed after the first wire is stretched using a stretching device; a second drying device, configured to dry the second wire, to reduce humidity of the second wire; and a micro-controller, electrically connected to the first drying device, the spinning device, the weight sensor, the hardness analyzing device, and the second drying device, where the micro-controller respectively sets drying temperatures of the first drying device and the second drying device in a range of 100° C. to 150° C., the micro-controller confirms whether the plurality of melt values is in line with a value of a semi-molten state, if the confirmation result is no, the micro-controller selects at least two discontinuous heating zones from the at least four heating zones to perform temperature adjustment again, the micro-controller analyzes whether the fiber hardness is in a hardness range, and if the analyzing result is no, the micro-controller selects at least two discontinuous heating zones from the at least four heating zones to perform temperature adjustment again.

In some embodiments, a temperature of the cooling liquid is measured using a first temperature sensor, to obtain a cooling temperature, and if the cooling temperature is not in a cooling temperature range, temperature adjustment is performed again on the at least two heating zones using the micro-controller. In this way, the heating temperatures of the plurality of heating zones can be adjusted in stages in real time, to avoid generating too many waste products, further reducing production cost loss.

In some embodiments, the heating device is a thermoplastic tank, the stretched first wire is immersed in hot water in the thermoplastic tank, to perform softening, a temperature of the hot water is measured using a second temperature sensor, to obtain a hot water temperature, and if the hot water temperature is not in a hot water temperature range, temperature adjustment is performed again on the at least two heating zones using the micro-controller. In this way, the heating temperatures of the plurality of heating zones can be adjusted in stages in real time, to avoid generating too many waste products, further reducing production cost loss.

In some embodiments, the first wire is repeatedly heated and stretched using a plurality of stretching devices and a plurality of heating devices, to form the second wire. In this way, a superfine fiber with high elongation can be manufactured.

In some embodiments, the second wire before drying is repeatedly stretched using a plurality of stretching devices. In this way, a superfine fiber with high elongation can be manufactured.

In some embodiments, the dried second wire is repeatedly stretched using a plurality of stretching devices. In this way, a superfine fiber with high elongation can be manufactured.

In some embodiments, the cooling liquid is water or oil.

In some embodiments, the ultra-high-molecular-weight fiber manufacturing system in the present invention may further comprise a first temperature sensor, electrically connected to the micro-controller, where the first temperature sensor is configured to measure a temperature of the cooling liquid, to obtain a cooling temperature, the micro-controller compares whether the cooling temperature is in a cooling temperature range, and if the comparison result is no, the micro-controller selects at least two discontinuous heating zones from the at least four heating zones to perform temperature adjustment again. In this way, the heating temperatures of the plurality of heating zones can be adjusted in stages in real time, to avoid generating too many waste products, further reducing production cost loss.

In some embodiments, the ultra-high-molecular-weight fiber manufacturing system in the present invention may further comprise a second temperature sensor, electrically connected to the micro-controller, where the second temperature sensor is configured to measure a hot water temperature of a heating device, to obtain a hot water temperature, the micro-controller compares whether the hot water temperature is in a hot water temperature range, and if the comparison result is no, the micro-controller selects at least two discontinuous heating zones from the at least four heating zones to perform temperature adjustment again. In this way, the heating temperatures of the plurality of heating zones can be adjusted in stages in real time, to avoid generating too many waste products, further reducing production cost loss.

The ultra-high-molecular-weight fiber manufacturing method and system in the present invention have the following characteristics. The to-be-processed raw material located in the spinning device can be maintained in the semi-molten state. The to-be-processed raw material in the semi-molten state is extruded to form the fibril used to manufacture a fiber. In addition, the hardness of the first wire generated during the manufacturing is detected. When the hardness of the first wire is not in a specified hardness range, respective temperature ranges of the plurality of heating zones of the spinning device are adjusted in stages in real time, to adjust the MI of the to-be-processed raw material and avoid generating too many fiber waste products. In this way, the ultra-high-molecular-weight fiber manufacturing method and system can improve the tensile strength and reduce the production cost loss.

DETAILED DESCRIPTION

Embodiments of the present invention are described in detail below with reference to the accompanying drawings. The accompanying drawings are mainly simplified schematic diagrams, which merely schematically illustrate the basic structure of the present invention. Therefore, only elements related to the present invention are indicated in the accompanying drawings, and the elements shown are not drawn in terms of the number, shape, size ratio, and the like during the implementation. The specification and size during the actual implementation are indeed an optional design, and the element layout and form may be more complicated.

The following embodiments are described with reference to the accompanying drawings, which are used to exemplify specific embodiments for implementation of the present invention. Terms about directions mentioned in the present invention, such as "on", "below", "front", and "back" merely refer to directions in the accompanying drawings. Therefore, the used terms about directions are used to describe and understand this application, and are not intended to limit this application. In addition, throughout this specification, unless otherwise explicitly described to have an opposite meaning, the word "include" is understood as including the element, but not excluding any other element.

Figure 1:
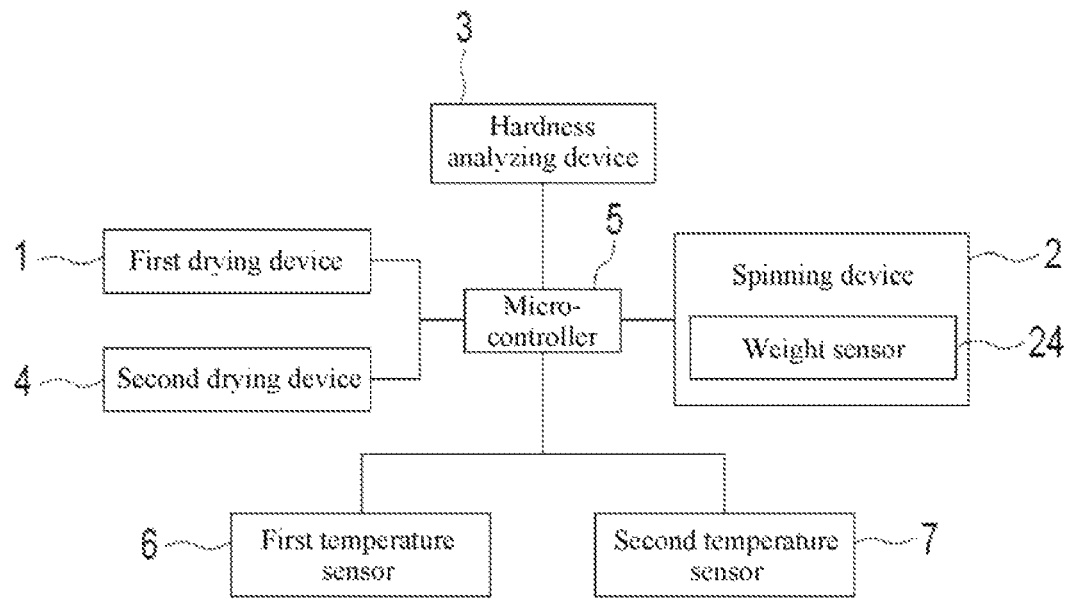
FIG. 1 is a system block diagram of an ultra-high-molecular-weight fiber manufacturing system according to the present invention.

FIG. 1 shows a preferable embodiment of an ultra-high-molecular-weight fiber manufacturing system according to the present invention. The system includes: a first drying device 1, a spinning device 2, a hardness analyzing device 3, a second drying device 4, and a micro-controller 5. The first drying device 1, the spinning device 2, the hardness analyzing device 3, and the second drying device 4 are separately electrically connected to the micro-controller 5.

Figure 2:
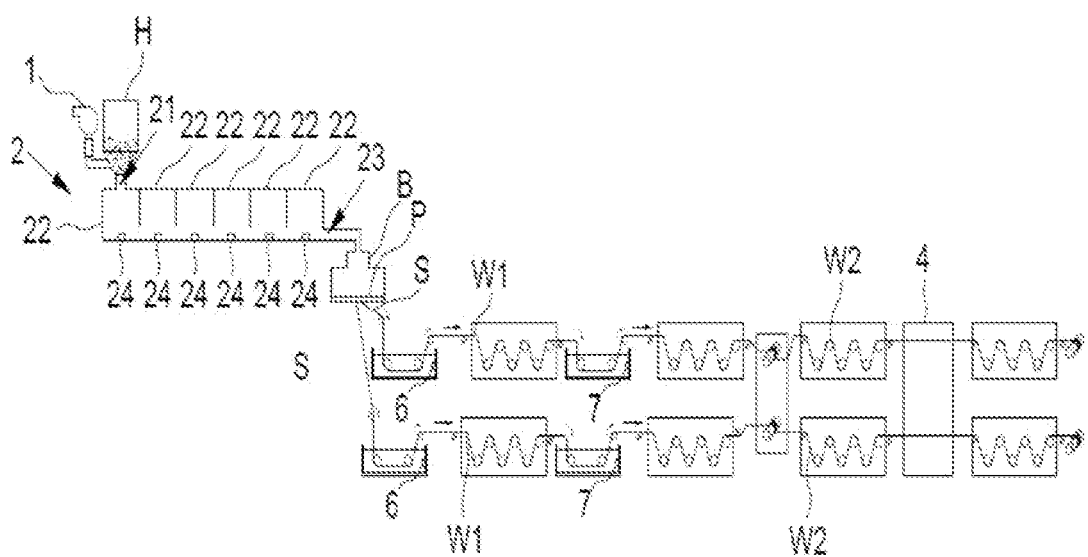
FIG. 2 is an equipment system diagram corresponding to an ultra-high-molecular-weight fiber manufacturing system according to the present invention.

Referring to FIG. 2 together, the first drying device 1 is configured to dry a mixed liquid located in a hopper H, to remove moisture in the mixed liquid and form a to-be-processed raw material. The mixed liquid is a raw material used to manufacture an ultra-high-molecular-weight fiber in the present invention. In this embodiment, the first drying device 1 is a dryer.

The spinning device 2 has a feed inlet 21, at least four heating zones 22, and a discharge outlet 23. The feed inlet 21 is in communication with the hopper H, for the to-be-processed raw material to flow to the at least four heating zones 22. The at least four heating zones 22 are continuously arranged between the feed inlet 21 and the discharge outlet 23 and respectively heat the to-be-processed raw material in different stages using heaters, to make the to-be-processed raw material form a semi-molten state.

In this embodiment, the spinning device 2 is an extruder and can extrude the to-be-processed raw material toward the discharge outlet 23 using a screw, to make the to-be-processed raw material flow into a spinning box B and make a spinneret P of the spinning box B spin at least one fibril. There are six heating zones 22. Respective preset temperature ranges of the six heating zones 22 from the feed inlet 21 to the discharge outlet 23 may respectively be: 65° C. to 90° C., 90° C. to 120° C., 120° C. to 150° C., 135° C. to 175° C., 175° C. to 205° C., and 195° C. to 225° C.

It is worth mentioning that, the spinneret P may have a plurality of circular holes P1. Apertures of the plurality of circular holes P1 are all consistent. Therefore, when the to-be-processed raw material is extruded through the plurality of circular holes P1, a plurality of fibrils can be formed. In another embodiment, the spinneret P may have at least one strip-shaped opening P2. Therefore, when the to-be-processed raw material is extruded through the strip-shaped opening P2, a fiber film can be formed.

A weight sensor 24 is arranged in each of the heating zones 22. The weight sensor 24 is configured to measure an MI of the to-be-processed raw material in the corresponding heating zone 22, to obtain a melt value. In this embodiment, the weight sensor 24 may be an MI tester. A model number of the MI tester may be MFI-100.

The hardness analyzing device 3 is configured to analyze hardness of a first wire W1, to obtain fiber hardness. The spinning device 2 spins a fibril S formed by the to-be-processed raw material, and the first wire W1 is formed after the fibril S is cooled using a cooling liquid. In this embodiment, the hardness analyzing device 3 is a textile durometer.

The second drying device 4 is configured to dry a second wire W2, to reduce humidity of the second wire W2. The second wire W2 is formed after the first wire W1 is stretched using a stretching device C. In this embodiment, the second drying device 4 is a dryer.

The micro-controller 5 is electrically connected to the first drying device 1, the spinning device 2, the hardness analyzing device 3, and the second drying device 4. The micro-controller 5 may be any electronic device with computing and signal generating functions, for example, a programmable logic controller (PLC), a digital signal processor (DSP), or a circuit board with the foregoing functions.

Specifically, the micro-controller 5 respectively sets drying temperatures of the first drying device 1 and the second drying device 4 in a range of 100° C. to 150° C. In addition, the micro-controller 5 may set baking time of the first drying device 1 in a range of 15 to 60 minutes, and set baking time of the second drying device 4 to 48 hours. The micro-controller 5 confirms whether the plurality of melt values is in line with a value of a semi-molten state. If the confirmation result is yes, no additional action may need to be performed. If the confirmation result is no, the micro-controller 5 selects at least two discontinuous heating zones 22 from the at least four heating zones 22 to perform temperature adjustment.

For example, when there are six heating zones 22, the micro-controller 5 may select a first heating zone, a third heating zone, and a fifth heating zone to perform temperature adjustment. Alternatively, the micro-controller 5 may select a second heating zone, a fourth heating zone, and a sixth heating zone to perform temperature adjustment. In addition, respective melt values of the to-be-processed raw material located in the corresponding heating zones 22 are made in line with the value of the semi-molten state, so that the to-be-processed raw material is maintained in the semi-molten state.

The micro-controller 5 obtains the hardness of the first wire W1 using the hardness analyzing device 3, and analyzes whether the hardness of the first wire W1 is in a hardness range. If the analyzing result is yes, no additional action may need to be performed. If the analyzing result is no, the micro-controller 5 performs temperature adjustment on the at least two heating zones 22 again.

The ultra-high-molecular-weight fiber manufacturing system in the present invention may further include a first temperature sensor 6, electrically connected to the micro-controller 5. The temperature sensor 6 is configured to measure a temperature of the cooling liquid, to obtain a cooling temperature. The micro-controller 5 compares whether the cooling temperature is in a cooling temperature range. If the comparison result is yes, no additional action may need to be performed. If the comparison result is no, the micro-controller 5 performs temperature adjustment on the at least two heating zones 22 again. In this embodiment, the cooling temperature range is in a range of 1° C. to 25° C.

The ultra-high-molecular-weight fiber manufacturing system in the present invention may further include a second temperature sensor 7, electrically connected to the micro-controller 5. The second temperature sensor 7 is configured to measure a hot water temperature of a heating device F, to obtain a hot water temperature. The heating device F is configured to heat the stretched first wire W1, to soften the first wire W1. Specifically, the heating device F may be a thermoplastic tank. The stretched first wire W1 may be immersed in hot water in the thermoplastic tank, to perform softening.

The micro-controller 5 compares whether the hot water temperature is in a hot water temperature range. If the comparison result is yes, no additional action may need to be performed. If the comparison result is no, the micro-controller 5 performs temperature adjustment on the at least two heating zones 22 again. In this embodiment, the hot water temperature range is in a range of 100° C. to 150° C.

For example, when the ultra-high-molecular-weight fiber manufacturing system in the present invention is in use, the micro-controller 5 can control the heaters of the plurality of heating zones 22 of the spinning device 2 to heat the to-be-processed raw material in different stages respectively at temperatures of 65° C. to 90° C., 90° C. to 120° C., 120° C. to 150° C., 135° C. to 175° C., 175° C. to 205° C., and 195° C. to 225° C., so that the to-be-processed raw material is maintained in the semi-molten state. The micro-controller 5 continuously receives the fiber hardness returned by the hardness analyzing device 3, the cooling temperature returned by the first temperature sensor 6, and the hot water temperature returned by the second temperature sensor. When the fiber hardness is lower than the hardness range, the micro-controller 5 can selectively adjust temperature ranges of the first heating zone 22, the third heating zone 22, and the fifth heating zone 22 respectively to 67° C. to 92° C., 122° C. to 152° C., and 177° C. to 207° C. Alternatively, when the cooling temperature is lower than the cooling temperature range, the micro-controller 5 can selectively adjust the temperature ranges of the first heating zone 22, the third heating zone 22, and the fifth heating zone 22 respectively to 67° C. to 92° C., 122° C. to 152° C., and 177° C. to 207° C. When the cooling temperature is higher than the cooling temperature range, the micro-controller 5 can selectively adjust temperature ranges of the second heating zone 22, the fourth heating zone 22, and the sixth heating zone 22 respectively to 88° C. to 118° C., 133° C. to 171° C., and 193° C. to 223° C. Still alternatively, when the hot water temperature is lower than the hot water temperature range, the micro-controller 5 can selectively adjust the temperature ranges of the first heating zone 22, the third heating zone 22, and the fifth heating zone 22 respectively to 67° C. to 92° C., 122° C. to 152° C., and 177° C. to 207° C. When the hot water temperature is higher than the hot water temperature range, the micro-controller 5 can selectively adjust the temperature ranges of the second heating zone 22, the fourth heating zone 22, and the sixth heating zone 22 respectively to 88° C. to 118° C., 133° C. to 171° C., and 193° C. to 223° C. Therefore, the MI of the to-be-processed raw material located in the spinning device 2 is adjusted, so that hardness of a finally manufactured final wire product can meet a required standard.

Figure 3:
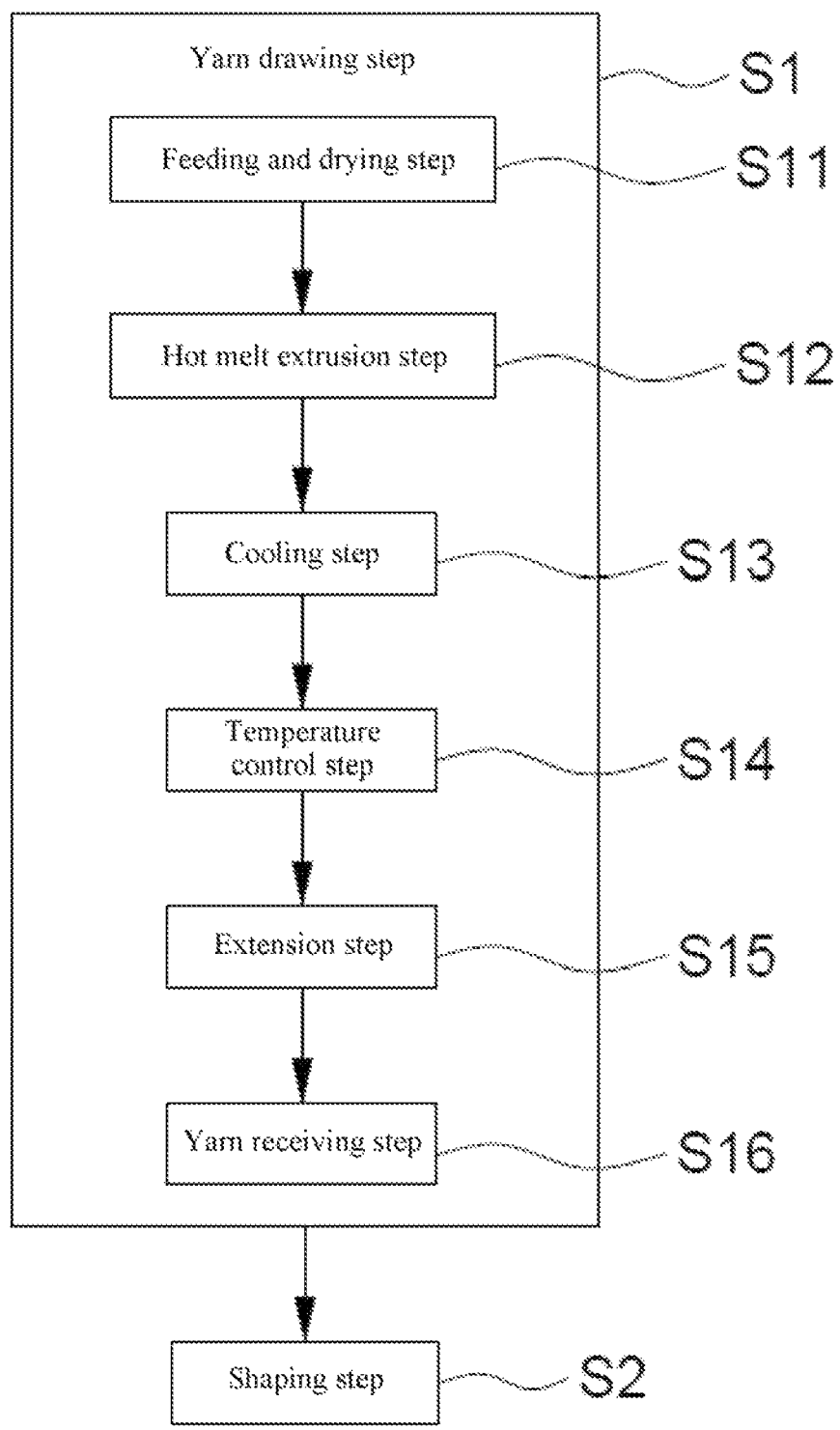
FIG. 3 is a step flowchart of an ultra-high-molecular-weight fiber manufacturing method according to the present invention.

FIG. 3 shows a preferable embodiment of an ultra-high-molecular-weight fiber manufacturing method according to the present invention. This method includes: a yarn drawing step S1 and a shaping step S2.

In this embodiment, the yarn drawing step S1 includes a feeding and drying step S11, a hot melt extrusion step S12, a cooling step S13, a temperature control step S14, an extension step S15, and a yarn receiving step S16.

The feeding and drying step S11 is used for mixing a fiber slurry with a plurality of colloidal particles, to form a mixed liquid, putting the mixed liquid into a hopper H, and performing hot air drying on the mixed liquid using a first drying device 1 to remove moisture, to form a to-be-processed raw material. A baking temperature of the first drying device 1 is in a range of 100° C. to 150° C., and baking time of the first drying device 1 may be in a range of 15 to 60 minutes.

In this embodiment, the fiber slurry may optionally include at least one fiber of a cotton fiber, a polyester fiber, a viscose fiber, a Modal fiber, an ultra-high-molecular-weight polyethylene (PE) fiber, a polypropylene (PP) fiber, an aromatic polyamide (PA) fiber, a PA fiber, a polyethylene terephthalate (PET) fiber, a polyethylene naphthalate (PEN) fiber, an extended-chain polyvinyl alcohol (PVA) fiber, an extended-chain polyacrylonitrile (PAN) fiber, a polybenzoxazole (PBO) fiber, a polybenzothiazole fiber, a liquid crystal copolyester fiber, a rigid rod fiber, a glass fiber, a structural glass fiber, and a resistant glass fiber. The plurality of colloidal particles may be fine particles in powder form and cannot be directly made into a masterbatch. The plurality of colloidal particles may be thermoplastic polyurethane (TPU) colloidal particles. The TPU colloidal particles may include TPU, PE, PP, PET, PA, polybutylene terephthalate (PBT), ethylene-vinyl acetate (EVA) copolymer, or nylon.

The hot melt extrusion step S12 is used for supplying the to-be-processed raw material to a spinning device 2. The spinning device 2 has at least four heating zones 22. The at least four heating zones 22 respectively heat the to-be-processed raw material in different stages using heaters, to make the to-be-processed raw material form a semi-molten state. The spinning device 2 can extrude the to-be-processed raw material toward a discharge outlet 23 using a screw, to make the to-be-processed raw material flow into a spinning box B and make a spinneret P of the spinning box B spin at least one fibril S.

The cooling step S13 is used for cooling the at least one fibril S using a cooling liquid, to shape a surface of the at least one fibril S, to form a first wire W1. In this embodiment, the cooling liquid may be water or oil.

In some embodiments, the cooling step S13 may be further measuring a temperature of the cooling liquid using a first temperature sensor 6, to obtain a cooling temperature. If the cooling temperature is not in a cooling temperature range, at least two discontinuous heating zones 22 are selected from the at least four heating zones 22 using a micro-controller 5 to perform temperature adjustment. Otherwise, the micro-controller 5 may need to perform no additional action.

The temperature control step S14 is used for analyzing hardness of the first wire W1 using a hardness analyzing device 3. If the hardness of the first wire W1 is not in a hardness range, temperature adjustment is performed again on the at least two heating zones 22 using the micro-controller 5. Otherwise, the micro-controller 5 may need to perform no additional action.

The extension step S15 is used for passing the first wire W1 through a stretching device C (a first stretching device), to make a plurality of rollers of the first stretching device stretch the first wire W1. Specifically, the plurality of rollers is arranged regularly at a fixed interval, so that the micro-controller 5 can be used to control rotating speeds of the plurality of rollers, and control a tension applied to the first wire, to adjust a cross-sectional shape and thickness of the first wire W1.

Then, in the extension step S15, a stretched first wire W1 is heated using a heating device F, to soften the first wire W1; and a softened first wire W1 is passed through a stretching device C (a second stretching device) and stretched again, to form a second wire W2.

It is worth mentioning that, in the extension step S15, quantities of stretching devices C and heating devices F may be set as required, to repeatedly heat and stretch the first wire W1, to form the second wire W2. As an example rather than a limitation, the quantity of stretching devices C may be N (N≥2), and the quantity of heating devices F may be N−1. In addition, the first wire W1 is passed through the first stretching device, a first heating device, the second stretching device, a second heating device, . . . , an $(N-1)^{th}$ stretching device, an $(N-1)^{th}$ heating device, and an $N^{th}$ stretching device in sequence, to finally form the second wire W2.

In some embodiments, the extension step S15 may be further measuring a hot water temperature of the heating device F using a second temperature sensor 7, to obtain a hot water temperature. If the hot water temperature is not in a hot water temperature range, temperature adjustment is performed again on the at least two heating zones 22 using the micro-controller 5.

The yarn receiving step S16 is used for winding the second wire W2 around a drum R in a coiling manner. Specifically, a plurality of drums R may be arranged on a yarn receiving rack T. Through centrifugal rotation of each of the drums R, the second wire W2 is made to rotate synchronously along the corresponding drum R and then be wound around the drum R, to form a ring shape.

The shaping step S2 is used for passing the second wire W2 wound around the drum R through a stretching device C (a third stretching device), to make a plurality of rollers of the third stretching device stretch the second wire W2; drying a stretched second wire W2 using a second drying device 4, to further reduce humidity of the second wire W2; and passing a dried second wire W2 through a stretching device C (a fourth stretching device), and performing stretching again, to form a final wire product W3. A baking temperature of the second drying device 4 is in a range of 100° C. to 150° C., and baking time of the second drying device 4 may be 48 hours.

In the shaping step S2, the final wire product W3 may be wound in a coiling manner by controlling the rotation of the drum R. Alternatively, by controlling rotation of a container and using centrifugal rotation of the container, the shape of the final wire product W3 falling into the container may be a ring along the container, but is not limited thereto.

In some embodiments, in the shaping step S2, before drying and after drying, the quantities of stretching devices C the second wire W2 passes through may be set as required. In addition, the quantities of stretching devices C the second wire W2 pass through both before drying and after drying may be at least one. That is, a plurality of stretching devices C may be used to repeatedly stretch the second wire W2 before drying or/and a plurality of stretching devices C may be used to repeatedly stretch the dried second wire W2.

As described above, according to the ultra-high-molecular-weight fiber manufacturing method and system in the present invention, the to-be-processed raw material located in the spinning device can be maintained in the semi-molten state. The to-be-processed raw material in the semi-molten state is extruded to form the fibril used to manufacture a fiber. In addition, the hardness of the first wire generated during the manufacturing is detected. When the hardness of the first wire is not in a specified hardness range, respective temperature ranges of the plurality of heating zones of the spinning device are adjusted in stages in real time, to adjust the MI of the to-be-processed raw material and avoid generating too many fiber waste products. In this way, the ultra-high-molecular-weight fiber manufacturing method and system can improve the tensile strength and reduce the production cost loss.

The implementation forms disclosed above are merely exemplary descriptions of the principle, features, and effects of the present invention, and are not intended to limit the implementable scope of the present invention. Any person skilled in the art can make modifications and changes to the foregoing implementation forms without departing from the spirit and scope of the present invention. Any equivalent change and modification made using the contents disclosed in the present invention should still fall within the scope of the following claims.

What is claimed is:

1. An ultra-high-molecular-weight fiber manufacturing method, comprising:
    mixing a fiber slurry with a plurality of colloidal particles, to form a mixed liquid, putting the mixed liquid into a hopper, and performing hot air drying on the mixed liquid using a first drying device to remove moisture, to form a to-be-processed raw material, wherein a baking temperature of the first drying device is in a range of 100° C. to 150° C.;
    supplying the to-be-processed raw material to a spinning device, wherein the spinning device has at least four heating zones, the at least four heating zones respectively heat the to-be-processed raw material in different stages, to make the to-be-processed raw material form a semi-molten state, and the spinning device extrudes the to-be-processed raw material toward a discharge outlet, to make the to-be-processed raw material flow into a spinning box and make a spinneret of the spinning box spin at least one fibril;
    cooling the at least one fibril using a cooling liquid, to shape a surface of the at least one fibril, to form a first wire;
    analyzing hardness of the first wire using a hardness analyzing device, wherein if the hardness of the first wire is not in a hardness range, at least two discontinuous heating zones are selected from the at least four heating zones using a micro-controller to perform temperature adjustment;
    passing the first wire through a first stretching device, to make a plurality of rollers of the first stretching device stretch the first wire, heating a stretched first wire using a heating device, to soften the first wire, passing a softened first wire through a second stretching device, and performing stretching again, to form a second wire;
    winding the second wire around a drum; and
    passing the second wire wound around the drum through a third stretching device, to make a plurality of rollers of the third stretching device stretch the second wire, drying a stretched second wire using a second drying device, to reduce humidity of the second wire, passing a dried second wire through a fourth stretching device, and performing stretching again, to form a final wire product.

2. The ultra-high-molecular-weight fiber manufacturing method according to claim 1, wherein a temperature of the cooling liquid is measured using a first temperature sensor, to obtain a cooling temperature, and if the cooling temperature is not in a cooling temperature range, temperature adjustment is performed again on the at least two heating zones using the micro-controller.

3. The ultra-high-molecular-weight fiber manufacturing method according to claim 1, wherein the heating device is a thermoplastic tank, the stretched first wire is immersed in hot water in the thermoplastic tank, to perform softening, a temperature of the hot water is measured using a second temperature sensor, to obtain a hot water temperature, and if the hot water temperature is not in a hot water temperature range, temperature adjustment is performed again on the at least two heating zones using the micro-controller.

4. The ultra-high-molecular-weight fiber manufacturing method according to claim 1, wherein the first wire is repeatedly heated and stretched using a plurality of stretching devices and a plurality of heating devices, to form the second wire.

5. The ultra-high-molecular-weight fiber manufacturing method according to claim 1, wherein the second wire before drying is repeatedly stretched using a plurality of stretching devices.

6. The ultra-high-molecular-weight fiber manufacturing method according to claim 1, wherein the dried second wire is repeatedly stretched using a plurality of stretching devices.

7. The ultra-high-molecular-weight fiber manufacturing method according to claim 1, wherein the cooling liquid is water or oil.

8. An ultra-high-molecular-weight fiber manufacturing system, comprising:
- a first drying device, configured to dry a mixed liquid located in a hopper, to remove moisture in the mixed liquid and form a to-be-processed raw material;
- a spinning device, having a feed inlet, at least four heating zones, and a discharge outlet, wherein the feed inlet is in communication with the hopper, for the to-be-processed raw material to flow to the at least four heating zones, the at least four heating zones are continuously arranged between the feed inlet and the discharge outlet and respectively heat the to-be-processed raw material in different stages, to make the to-be-processed raw material form a semi-molten state, a weight sensor is arranged in each of the heating zones, the weight sensor is configured to measure a melt index (MI) of the to-be-processed raw material in the corresponding heating zone, to obtain a melt value, the spinning device spins a fibril formed by the to-be-processed raw material, and a first wire is formed after the fibril is cooled using a cooling liquid;
- a hardness analyzing device, configured to analyze hardness of the first wire, to obtain fiber hardness, wherein a second wire is formed after the first wire is stretched using a stretching device;
- a second drying device, configured to dry the second wire, to reduce humidity of the second wire; and
- a micro-controller, electrically connected to the first drying device, the spinning device, the weight sensor, the hardness analyzing device, and the second drying device, wherein the micro-controller respectively sets drying temperatures of the first drying device and the second drying device in a range of 100° C. to 150° C., the micro-controller confirms whether the plurality of melt values is in line with a value of a semi-molten state, if the confirmation result is no, the micro-controller selects at least two discontinuous heating zones from the at least four heating zones to perform temperature adjustment again, the micro-controller analyzes whether the fiber hardness is in a hardness range, and if the analyzing result is no, the micro-controller selects at least two discontinuous heating zones from the at least four heating zones to perform temperature adjustment again.

9. The ultra-high-molecular-weight fiber manufacturing system according to claim 8, further comprising a first temperature sensor, electrically connected to the micro-controller, wherein the first temperature sensor is configured to measure a temperature of the cooling liquid, to obtain a cooling temperature, the micro-controller compares whether the cooling temperature is in a cooling temperature range, and if the comparison result is no, the micro-controller selects at least two discontinuous heating zones from the at least four heating zones to perform temperature adjustment again.

10. The ultra-high-molecular-weight fiber manufacturing system according to claim 8, further comprising a second temperature sensor, electrically connected to the micro-controller, wherein the second temperature sensor is configured to measure a hot water temperature of a heating device, to obtain a hot water temperature, the micro-controller compares whether the hot water temperature is in a hot water temperature range, and if the comparison result is no, the micro-controller selects at least two discontinuous heating zones from the at least four heating zones to perform temperature adjustment again.

* * * * *